C. Russell,

Horse Power,

No. 1,302, Reissued Apr. 15, 1862

Witnesses.
Harry H. Ince
John Matthy.

Inventor.
Clement Russell
By atty N. B. Stoughton.

AM. PHOTO-LITHO. CO. N.Y. (OSBORNE'S PROCESS.)

UNITED STATES PATENT OFFICE.

CLEMENT RUSSELL, OF MASSILLON, OHIO.

IMPROVEMENT IN DOUBLE-GEARED HORSE POWERS.

Specification forming part of Letters Patent No. 12,782, dated May 1, 1855; Reissue No. 1,302, dated April 15, 1862.

*To all whom it may concern:*

Be it known that I, CLEMENT RUSSELL, of Massillon, in the county of Stark and State of Ohio, have invented certain new and useful Improvements in Horse-Powers; and I do hereby declare that the following is a full, clear, and exact description of the construction and operation of the same, reference being had to the accompanying drawings, making a part of this specification, in which—

Figure 1:
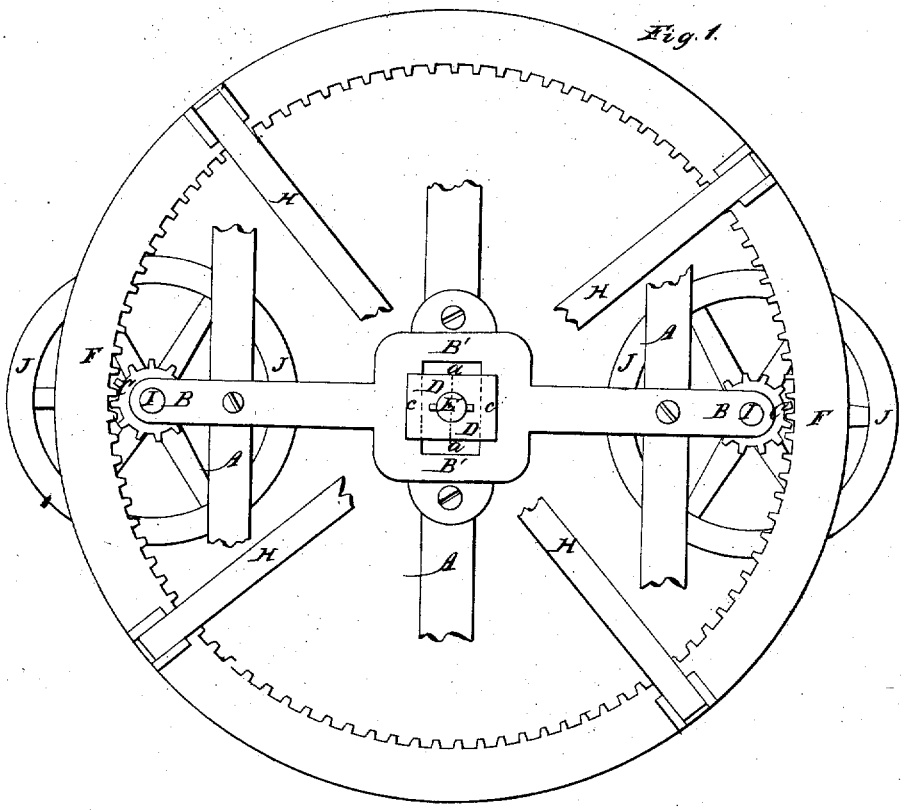
Figure 2:
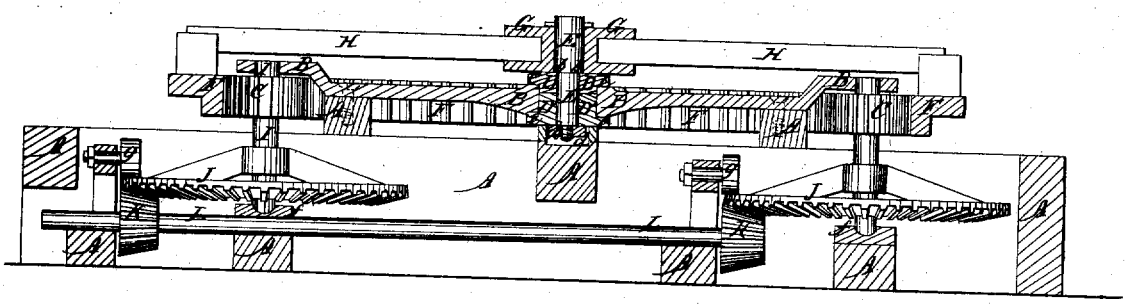

Figure 1 represents a top plan, with the arms broken away near the hub or center to better show the parts underneath them. Fig. 2 represents a vertical longitudinal section through the bridge-tree or arm carrying the two pinions and the main wheel and the parts under it, except the gearing, which is left entire or uncut.

Similar letters of reference, when they occur in the separate figures, denote like parts of the apparatus in both of the drawings.

In horse-powers, when one cog-wheel is to run in gear with two other cog-wheels, each wheel running upon its own journal or shaft-gearing into two transmitting-pinions on the same shaft, it was found impossible to make or hang such wheels as to make them run free and smooth, each doing equal duty, and not binding or cutting. A remedy to a certain extent was discovered to avoid this difficulty—viz., by hanging the wheel that had to gear with the two others on a shaft that could move in a direction transverse to that of the two wheels, and thus adjust itself to those that ran upon fixed bearings; but after a little use of such a shaft or bearing it was found that it would allow the wheel to move from or toward the two pinions that it worked with, and thus produce an evil that was more objectionable than the one designed to obviate by running one gear in and the other out of action. This yielding in the wrong direction was due to the wearing away of the shaft or pin, or of the guides against which it moved, there being so little surface-contact between the two.

My invention consists in the introduction of a sliding block and pin or bearing of the main drive-wheel, and the oblong opening in the bridge-tree, so that said block, which may have great surface-bearing, shall move with the pin and prevent the pin from moving in any other direction than that of the oblong slot, and I thus avoid the wearing away and shackle motion of the pin, and prevent the evil that grew out of these contingencies when used without the sliding block.

To enable others skilled in the art to make and use my invention, I will proceed to describe the same with reference to the drawings.

A represents a stout substantial frame, upon which the mechanism that forms the horse-power is mounted. The bridge-tree B, that has at each end of it a pinion, C, is securely and firmly bolted to the frame A. The center portion, B, of the bridge-tree is enlarged so as to admit of an oblong opening, *a*, in it, said opening extending in a line at right angles to the line of the bridge-tree, as shown in Fig. 1. In the oblong opening *a* is placed a block of less length than the length of the opening, but fitting snugly against the sides thereof. This block or nut, for the sake of easy insertion, is made in two parts, D D′, the part D having flanges *c c*, which project over onto the bridge-tree on top, and move on ways or bearings on said bridge-tree. The other part, D′, has flanges *e e*, which are in contact with the under side of the bridge-tree, and also move on ways or bearings on said bridge-tree. The block or nut being placed in the slot, with the flanges projecting as stated, a center pin, E, is passed through the holes in said two parts of the block until a shoulder, *b*, on said pin rests upon the upper side of the upper part of the block, and a nut, *d*, is then run onto the screw-thread cut on its lower end until it comes up tightly against the under side of the under part of said block, and thus the two parts of the block or nut are firmly held together as though it were one piece, and the center pin, E, is rigid in the block or nut, and can move only with the block, and in the line of the oblong slot *a*, the block having side bearings of considerable depth, and its flanges at top and underneath to prevent it from moving laterally.

The main driving-wheel F is composed of a rim having internal gears or teeth formed upon it, and said rim is connected to the hub or center G by radial arms H, and this hub or center G is placed over and turns upon the upper portion of the pin E, as a journal which always preserves its vertical position while it may move with its block or slide D′ through the oblong slot *a*. The main wheel, therefore, has a movable center pin to turn upon, but movable only in a line at right angles to a line drawn through the centers of the pinions C C, which turn in immovable bearings, and with which the main wheel F works. The object and importance of this arrangement is obvious, for however carefully this gearing is made and fitted together, and to the frame, it is impossible to make the wheels or their cogs work together evenly and smoothly. But by allowing the drive-wheel play in a line transverse to the line of the bridge-tree, it will adjust itself to the pinions and work perfectly true with them, for the moment the drive-wheel is resisted by one pinion more than by the other it will move when it is least resisted, and thus perfectly adjust itself. This adjustment, by allowing a wheel to move upon its center pin as I have before stated, has long ago been essayed, but in allowing it this motion no provision was made for preventing its motion in a longitudinal direction, which was productive of as great an evil as it was desired to avoid, while, therefore, I preserve all the benefit of the self-adjustment, I provide against the evil that heretofore was incident to that self-adjustment by using with the movable pin a sliding-block so supported as not to move toward the pinions.

On the shafts I of the pinions C, and below the pinions, are hung bevel gear-wheels J, the lower ends of said shafts resting and turning in steps *f* on the frame, while their upper ends are supported and turn in bearings formed in the ends respectively of the bridge-tree B. These bevel-gears J work into bevel-pinions K on the shaft L, and from this shaft the power is carried to the machinery to be driven by it in any of the well-known ways. *g* are friction-rollers for holding down the bevel-gears to the bevel-pinions.

Having thus fully described the nature and object of my invention, what I claim is—

In connection with double-geared horse-powers, the combined use of a center pin and moving-block for allowing the drive-wheel to adjust itself to the pinions with which it works, substantially as herein described.

CLEMENT RUSSELL.

Witnesses:

G. W. WILLIAMS,

FREDK. FOCKE.